United States Patent
Nekado

(10) Patent No.: US 6,541,960 B2
(45) Date of Patent: *Apr. 1, 2003

(54) POSITION DETECTOR UTILIZING MAGNETIC SENSORS AND A BIAS MAGNETIC FIELD GENERATOR

(75) Inventor: Yasuo Nekado, Kanagawa (JP)

(73) Assignee: Sony Precision Technology Inc., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/818,873

(22) Filed: Mar. 27, 2001

(65) Prior Publication Data

US 2001/0026154 A1 Oct. 4, 2001

(30) Foreign Application Priority Data

Mar. 29, 2000 (JP) ........................................ 2000-095294

(51) Int. Cl.[7] .............................. G01B 7/14; G01B 7/30
(52) U.S. Cl. ............................ 324/207.15; 324/207.24; 324/207.17
(58) Field of Search ..................... 324/207.15, 207.24, 324/207.19, 207.2, 207.21, 207.17, 207.16, 207.22; 338/32 R, 32 H

(56) References Cited

U.S. PATENT DOCUMENTS 5,952,825 A * 9/1999 Wan ............................ 324/252
5,970,026 A   10/1999 Wachi et al. ................. 369/13
6,373,239 B1 * 4/2002 Nekado .................. 324/207.15

FOREIGN PATENT DOCUMENTS

EP    2000055930    2/2000    ........... G01P/15/08

* cited by examiner

Primary Examiner—Edward Lefkowitz
Assistant Examiner—Subhash Zaveri
(74) Attorney, Agent, or Firm—Jay H. Maioli

(57) ABSTRACT

A position transducer includes a bias circuit that drives and controls first and second bias coils. The bias circuit monitors the value of a voltage produced in a second sensor coil and drives and controls the first and second bias coils such that the value of the voltage produced in the second sensor coil is always equal to a desired voltage value.

4 Claims, 8 Drawing Sheets ly, the MI effect type sensor has not a coil corresponding to the exciting coil in the flux gate type sensor since the detection coil in the magnetic detector is directly driven.

POSITION DETECTOR UTILIZING MAGNETIC SENSORS AND A BIAS MAGNETIC FIELD GENERATOR

BACKGROUND OF THE INVENTION

1. Field of the Invention

The present invention relates to a magnetic sensor which detects an external magnetic field and a position transducer using the magnetic sensor.

2. Description of the Related Art

As a magnetic sensor which detects an external magnetic field, there is known a one called flux gate type sensor. The flux gate type sensor includes a magnetic detector consisting of a core made of a high permeability material such as Ni—Fe alloy and an exciting coil and sensor coil wound on the core. In the flux gate type sensor, when the exciting coil in the magnetic detector is driven with a sinusoidal or rectangular wave of tens kHz, the inductance of the core in the magnetic detector will be changed correspondingly to the strength of an external magnetic field incident upon the detection coil in the direction of the center axis of coil winding. In the flux gate type sensor, the strength of the external magnetic field is detected by converting a change of the core inductance to a voltage change.

It is known that with an optimum bias magnetic field applied to the magnetic detector, the flux gate type sensor will be able to detect even a faint magnetic field which is weaker than $\frac{1}{10}$, for example, of the geomagnetism and also provide an output with an increased linearity, thus have a wider output dynamic range. Therefore, when the flux gate type sensor is used to detect an external magnetic field, the magnetic detector should desirably be applied with an optimum bias magnetic field.

As a magnetic sensor similar to the flux gate type sensor, there is also known a magnetic impedance effect type sensor using the so-called magnetic impedance effect (MI effect, hereunder). The MI effect type sensor has not a coil corresponding to the exciting coil in the flux gate type sensor since the detection coil in the magnetic detector is directly driven.

In the MI effect type sensor, when the detection coil in the magnetic detector is driven with a high frequency pulse whose rate is a few MHz to tens MHz and width is a few ns to tens ns or a sinusoidal wave whose pulse rate is similar to that of the high frequency pulse, the inductance component as well as actual resistance component of the detection coil will be changed due to the skin effect of the magnetic material, resulted from the high frequency excitation, correspondingly to the strength of an external magnetic field incident upon the detection coil in the direction of the center axis of coil winding. In the MI effect type sensor, the strength of the external magnetic field is detected by converting the change in impedance of the detection coil, which is a sum of the changes in inductance component and actual resistance component, to a voltage change and detecting the voltage change.

Since the strength of the external magnetic field is detected based on the impedance change of the detection coil, the MI effect type sensor has a higher detecting sensitivity than the aforementioned flux gate type sensor. It is also known that with an optimum bias magnetic field applied to the magnetic detector, the MI effect type sensor will be able have a higher detecting sensitivity and provide an output with a higher linearity, thus have a wider output dynamic range. Therefore, also when the MI effect type sensor is used to detect an external magnetic field, an optimum bias magnetic field should desirably be applied to the magnetic sensor.

For applying a bias magnetic field to the magnetic sensor of the magnetic sensor, it is well known to apply to the magnetic detector of a magnetic field from a permanent magnet disposed near the magnetic detector, and apply to the magnetic detector of a magnetic field developed by driving a bias coil wound on the magnetic detector.

However, in case a permanent magnet is used to apply a bias magnetic field to the magnetic detector, the magnetic field is easily changed due to non-uniformity in shape and material of the permanent magnet, which makes it difficult to select and position a permanent magnet for application of an appropriate bias magnetic field. Thus, this method is disadvantageous in that the manufacturing cost is increased and the magnetic sensor cannot work stably.

On the other hand, in case a bias coil is used to apply a bias magnetic field to the magnetic detector, since the strength of a magnetic field developed by the bias coil is determined by the value of a current supplied to the bias coil, an optimum bias magnetic field can easily be applied to the magnetic detector of the magnetic sensor by setting the value of the current supplied to the bias coil to an appropriate one. Therefore, this method for applying a bias magnetic field to the magnetic detector using a bias coil can be said to be very effective.

It should be noted that the output characteristic of the magnetic sensor depends upon an environment in which the magnetic sensor is used, for example, on the ambient temperature or the like around the magnetic detector, and it will shift as the ambient temperature changes. In the MI effect type sensor for example, when the ambient temperature around the magnetic detector changes, the impedance of the detection coil will be changed correspondingly to the temperature change and thus the output characteristic of the sensor will shift. When the output characteristic thus shifts, the optimum bias point to improve the output linearity of the magnetic sensor will shift.

If the bias coil is always driven with a constant current when a bias coil is used to apply a bias magnetic field to the magnetic sensor, it is not possible to follow up a shift of an optimum bias point due to a change of the ambient temperature or the like around the magnetic detector and apply an optimum bias magnetic field to the magnetic detector, possibly resulting in a reduced output linearity of the magnetic sensor.

OBJECT AND SUMMARY OF THE INVENTION

It is therefore an object of the present invention to overcome the above-mentioned drawbacks of the prior art by providing a magnetic sensor which can well detect an external magnetic field even when the ambient temperature or the like around a magnetic detector of the magnetic sensor changes, by always applying an optimum bias magnetic field to the magnetic detector, and a position transducer using the magnetic sensor.

The above object can be attained by providing a magnetic sensor including a plurality of sensor units. Each of the plurality of sensor units includes a magnetic detector and a magnetic field developing means for applying a bias magnetic field to the magnetic detector. The magnetic sensor further includes means for driving and controlling the bias magnetic field developing means in the plurality of sensor units. In the magnetic sensor, the drive/control means monitors an output from the magnetic detector in one of the plurality of sensor units, and drives and controls the bias magnetic field developing means in the plurality of sensor units for the monitored magnetic detector to provide a constant output.

In the above magnetic sensor, the magnetic detectors of the sensor units detect an external magnetic field. At this time, the magnetic detectors are applied with bias magnetic fields, respectively, developed by the bias magnetic field developing means driven and controlled by the drive/control means. The drive/control means monitors the output from the magnetic detector in one of the plurality of sensor units, and drives and controls the bias magnetic field developing means of the plurality of sensor units for the monitored magnetic detector to provide a constant output.

Therefore, even when the ambient temperature or the like around the magnetic detectors changes, the bias magnetic field developing means can always apply an optimum bias magnetic field to the magnetic detectors to improve the output linearity.

Also the above object can be attained by providing a position transducer using the above-mentioned magnetic sensor. The position transducer includes a magnetic field developing means for developing a magnetic field whose strength and direction are changed correspondingly to a position of the magnetic field developing means, and a plurality of sensor units movable relatively to the magnetic field developing means. Each of the plurality of sensor units includes a magnetic detector and a bias magnetic field developing means for applying a bias magnetic field to the magnetic detector. Also, the position transducer further includes means for driving and controlling the bias magnetic field developing means in each of the sensor units, and means for detecting a moved position of each of the plurality of sensor units relative to the magnetic field developing means on the basis of an output from the magnetic detector in each of the plurality of sensor units. In this position transducer, the drive/control means monitors the output from the magnetic detector in one of the plurality of sensor units, and drives and controls the bias magnetic field developing means in each of the plurality of sensor units for the monitored magnetic detector to provide a constant output.

In the above position transducer, when the plurality of sensor units moves in relation to the magnetic field developing means, a magnetic field corresponding to the position of the magnetic field developing means will be incident upon the plurality of sensor units. The magnetic field from the magnetic field developing means and incident upon the plurality of sensor units will be detected by the magnetic detectors in the sensor units. At this time, the magnetic detectors are applied with bias magnetic fields, respectively, developed by the bias magnetic field developing means driven and controlled by the drive/control means. The drive/ control means monitors the output of one of the magnetic detectors in the plurality of sensor units, and drives and controls the bias magnetic field developing means in the plurality of sensor units for the monitored magnetic detector to provide a constant output. Therefore, even when the ambient temperature or the like around the magnetic detectors changes, the bias magnetic field developing means can always apply optimum bias magnetic fields to the magnetic detectors. The outputs of the magnetic detectors in the plurality of sensor units are supplied to the detecting means. The detecting means detect relative positions of the plurality of sensor units to the magnetic field developing means on the basis of the outputs from the magnetic detectors.

According to the present invention, even when the ambient temperature or the like around the magnetic detectors for detecting a magnetic field changes, an optimum bias magnetic field can always be applied to the magnetic detectors to detect the external magnetic field with a higher accuracy.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
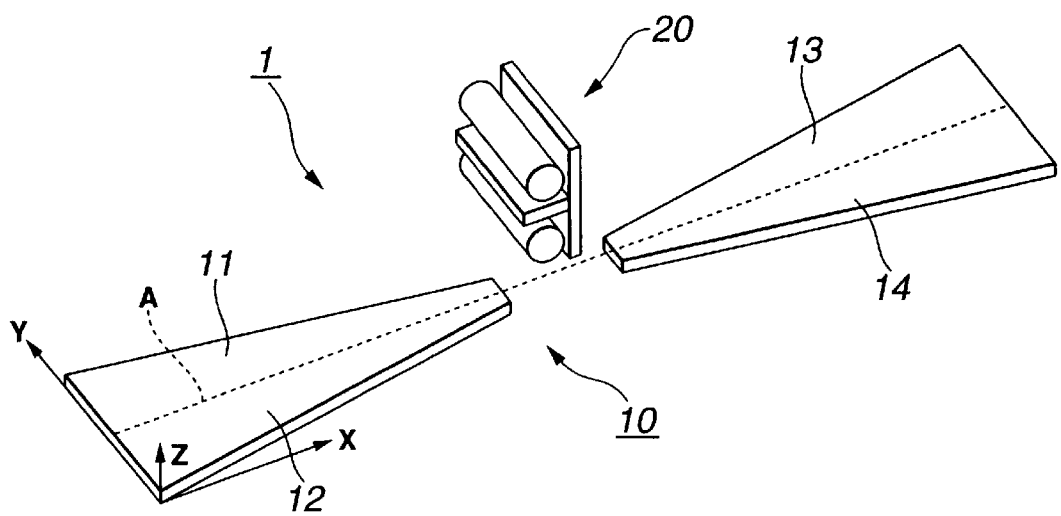
FIG. 1 is a perspective view of an embodiment of the position transducer according to the present invention, schematically showing the construction thereof.

Referring now to FIG. 1, there is schematically illustrated in the form of a perspective view the construction of an embodiment of the position transducer according to the present invention. The position transducer is generally indicated with a reference 1. As shown, the position transducer 1 includes a scale 10 which develops a magnetic field whose strength and direction change linearly depending upon a position of the scale 10 and a magnetic field sensor 20 which detects a magnetic field developed by the scale 10. Either the scale 10 or the magnetic field sensor 20 is fixed to a moving part being a linearly moving part of a machine tool, industrial robot or the like while the other is fixed to a stationary part of the machine tool, industrial robot or the like. As the moving part of the machine tool, industrial robot or the like moves linearly, the magnetic field sensor 20 is moved in relation to the scale 10 along the center line A of the scale 10, detects a magnetic field developed by the scale 10 at each moved position thereof, and provides an electrical signal corresponding to the detected magnetic field.

In the position transducer 1, an electrical signal indicating positional data provided from the magnetic field sensor 20 is supplied to a drive/detection circuit (not shown in FIG. 1). Then, the drive/detection circuit detects an amount of travel and moved position of the magnetic field sensor 20 relative to the scale 10 on the basis of the electrical signal supplied from the magnetic field sensor 20, to thereby detecting an amount of travel and moving distance of the moving part of the machine tool, industrial robot or the like. Note that the present invention will be described in further detail hereinbelow concerning the position transducer 1 in which the effective length for detection is set to 40 mm so that it can appropriately detect an amount of travel and moved position of a moving part moving linearly in a range of 40 mm at the maximum.

The scale 10 consists of first to fourth magnetic field developing members 11, 12, 13 and 14 each formed from a trapezoidal plate of a ferrite plastic magnet for example. These first to fourth magnetic field developing members 11, 12, 13 and 14 are identical in shape to each other, and magnetized in a direction perpendicular to main sides thereof. Note that the material of the first to fourth magnetic field developing members 11, 12, 13 and 14 is not limited to the above-mentioned ferrite plastic magnet but may be a selected one of SmCo magnet, NdFeB magnet, sintered magnet, FeMn and AlNiCo alloy magnets, etc.

Figure 2:
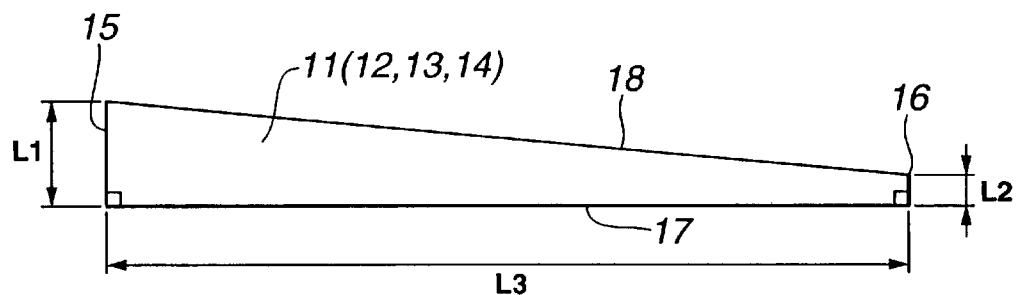
FIG. 2 is a plan view of the magnetic field developing members of the scale.

As shown in FIG. 2, each of the above magnetic field developing members 11, 12, 13 and 14 has first and second sides 15 and 16 parallel to each other, a third side perpendicular to the first and second sides 15 and 16, and a fourth side 18 forming an acute angle with the first side 15. The first side 15 has a length L1 of about 1.8 mm for example, the second side 16 has a length L2 of about 0.35 mm, and the third side 17 has a length L3 of about 23 mm.

Figure 3:
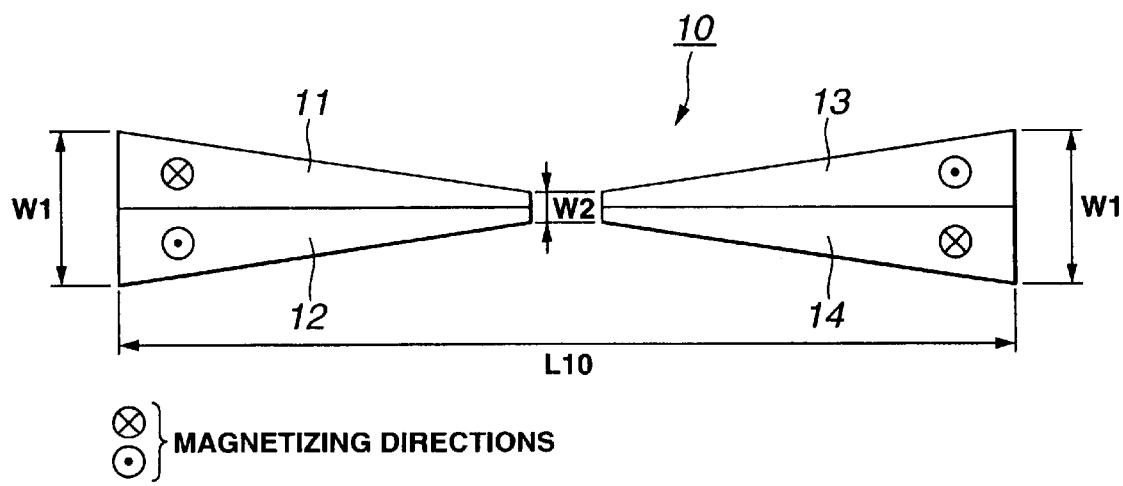
FIG. 3 is a plan view of the scale formed from a combination of the magnetic field developing members.

As shown in FIG. 3, the magnetic field developing members 11, 12, 13 and 14 are assembled together to form the scale 10. More specifically, the first and second magnetic field developing members 11 and 12 are disposed to abut each other at the third sides 17 thereof so that their magnetizing directions are opposite to each other, while the third and fourth magnetic field developing members 13 and 14 are disposed to abut each other at the third sides 17 thereof so that their magnetizing directions are opposite to each other. The first and third magnetic field developing members 11 and 13 are disposed to define a predetermined air gap between the second sides 16 thereof so that their magnetizing directions are opposite to each other while the second and fourth magnetic field developing members 12 and 14 are disposed to define a predetermined air gap between the second sides 16 thereof so that their magnetizing directions are opposite to each other.

The scale 10 thus formed from the assembly of the first to fourth magnetic field developing members 11, 12, 13 and 14 as in the above has a total length L10 of about 52 mm for example in the longitudinal direction thereof, a width W1 of about 3.6 mm for example at either longitudinal outer end thereof and a width W2 of about 0.7 mm for example at inner ends thereof opposite to each other with the predetermined air gaps between the sides 16.

The scale 10 thus constructed develops a magnetic field whose strength and direction change linearly at each longitudinal position along a center line A in FIG. 1. More particularly, of the magnetic field developed by the scale 10, a component detected on the center line A and parallel to the main sides of each of the magnetic field developing members 11, 12, 13 and 14 shows a strength which is gradually smaller as it goes from the longitudinal outer ends of the scale 10 towards a central portion of the scale 10 where the air gaps are defined as in the above. The magnetizing direction is inverted at the longitudinal center of the scale 10. Therefore, a magnetic field component existing on the center line A of the scale 10 and parallel to the main sides of the magnetic field developing members 11, 12, 13 and 14 will indicate positional data in the longitudinal direction of the scale 10, and thus a longitudinal position of the scale 10 can be detected by detecting the magnetic field component. Especially, with the scale 10, it is possible to obtain a magnetic field change having a high linearity in a range of about 40 mm except for a part at each longitudinal outer end of the scale 10, and a moved position of the magnetic field sensor 20 relative to the scale 10 can be detected with a high accuracy by moving the magnetic field sensor 20 relatively to the scale 10 within the above range (this range is taken as an effective length for detection).

Figure 4:
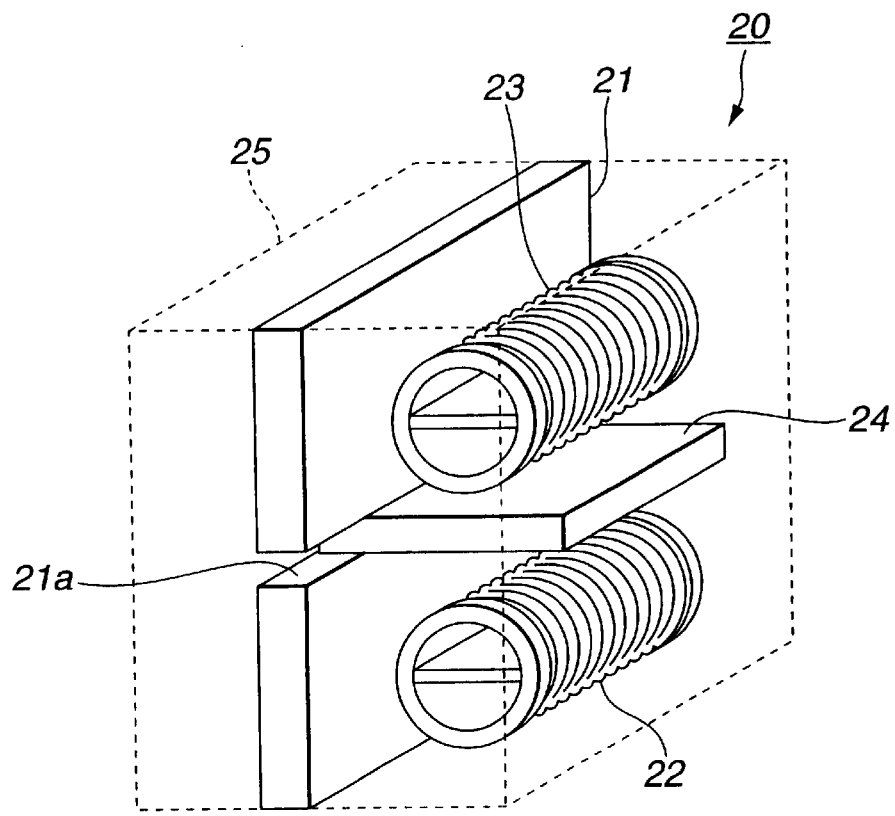
FIG. 4 is a perspective view of the magnetic sensor, schematically illustrating the construction thereof.

As shown in FIG. 4, the magnetic field sensor 20 includes a substrate 21 formed like a rectangular plate and having a cut 21a formed therein and which splits the main sides thereof into two areas. On the main side of the substrate 21, there are installed first and second sensor units 22 and 23 in the two areas split by the cut 21a. Also, there is fitted in the cut 21a in the substrate 21 a magnetic shielding plate 24 made of a magnetic material such as Fe and having a thickness of about 1 mm. The magnetic shielding plate 24 is provided to allow the first and second sensor units 22 and 23 to detect a local external magnetic field such as a magnetic field from the scale 10 with a difference in magnetic sensitivity between them. In the magnetic field sensor 20, one of the main sides of the substrate 21 on which the first and second sensor units 22 and 23 are installed and the other side of the substrate 21 to which a signal line (not shown) is connected, are covered with a protective material 25 formed from a resin or the like.

Figure 5:
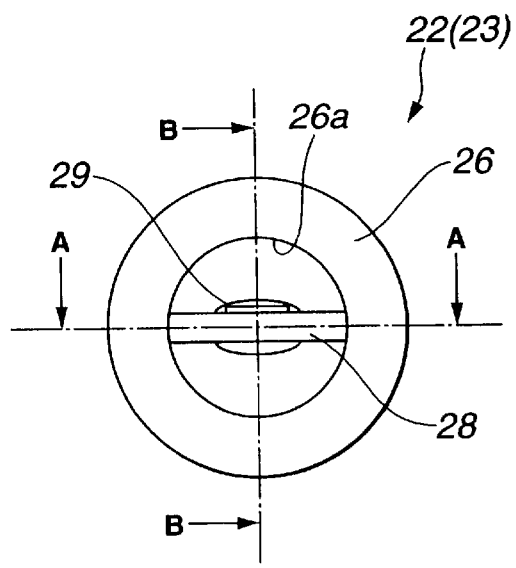
FIG. 5 is a plan view of each of the sensor units of the magnetic sensor from the end face thereof.
Figure 6:
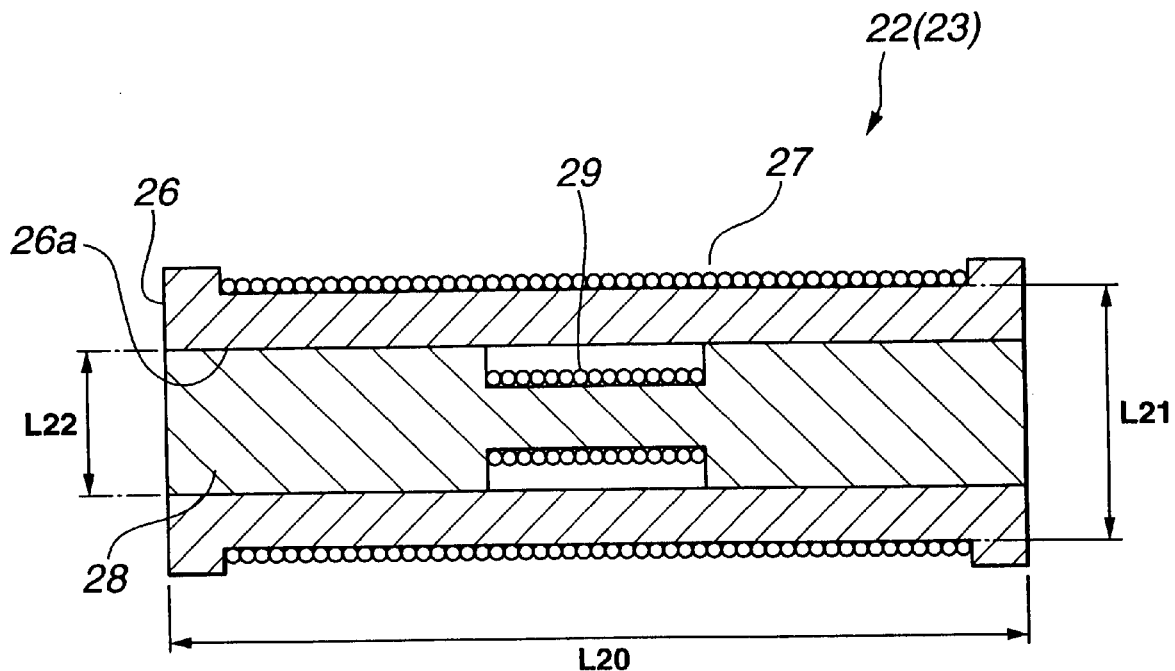
FIG. 6 is a sectional view taken along the line A—A in FIG. 5.
Figure 7:
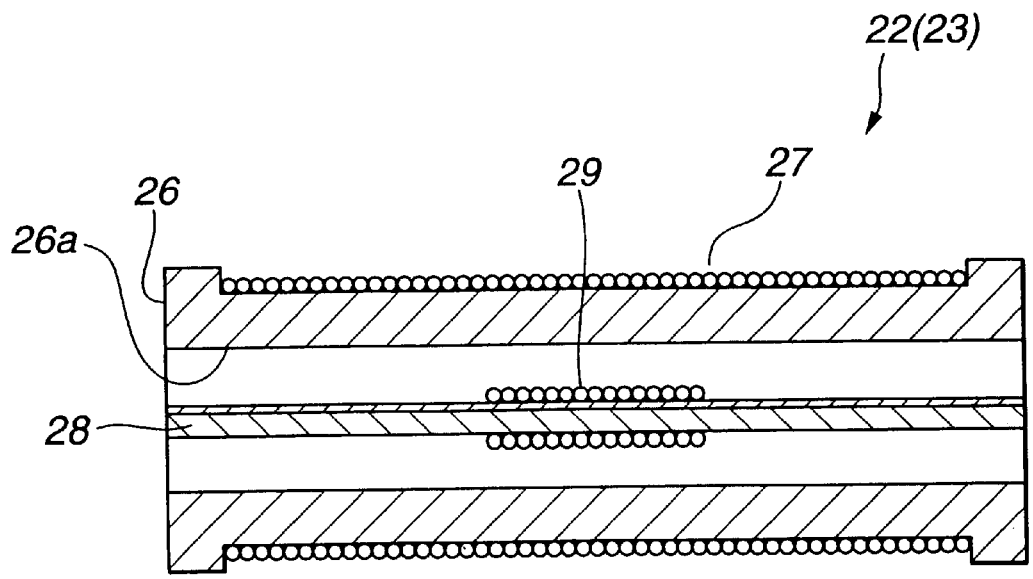
FIG. 7 is a sectional view taken along the line B—B in FIG. 5.

As shown in FIGS. 5 to 7, each of the first and second sensor units 22 and 23 includes a coil bobbin 26 formed cylindrical from a resin or the like, a bias coil 27 wound on the coil bobbin 26, a core unit 28 inserted n a center hole 26a in the coil bobbin 26, and a sensor coil 29 wound on the core unit 28. Note that FIG. 5 is a plan view of the first and second sensor units 22 and 23 from the end face of the coil bobbin 26, FIG. 6 is a sectional view taken along the line A—A in FIG. 5 and FIG. 7 is a sectional view taken along the line B—B in FIG. 5.

The coil bobbin 26 has a longitudinal length L20 of about 5 mm, and a diameter L21 of about 1.4 mm, for example, at the outer surface thereof on which the bias coil 27 is wound. Also, the center hole 26a in which the core unit 28 of the coil bobbin 26 is inserted has a diameter L22 of about 0.8 mm for example.

The bias coil 27 is provided to improve the output linearity of the first and second sensor units 22 and 23 with respect to an external magnetic field. It is formed from a Cu wire of 30 $\mu$m in diameter wound over a substantially whole outer surface of the coil bobbin 26. More particularly, the bias coil 27 is formed from 740 turns, for example, of the Cu wire wound on the outer surface of the coil bobbin 26, and the coil length is about 4 mm.

The bias coils 27 of the first and second sensor units 22 and 23, respectively, are connected in parallel to each other and built in a drive/detection circuit which will further be described later. Also, the bias coils 27 of the first and second sensor units 22 and 23 are driven with a DC current from the drive/detection circuit to develop bias magnetic fields which improve the output linearity of the first and second sensor circuits 22 and 23.

Figure 8:
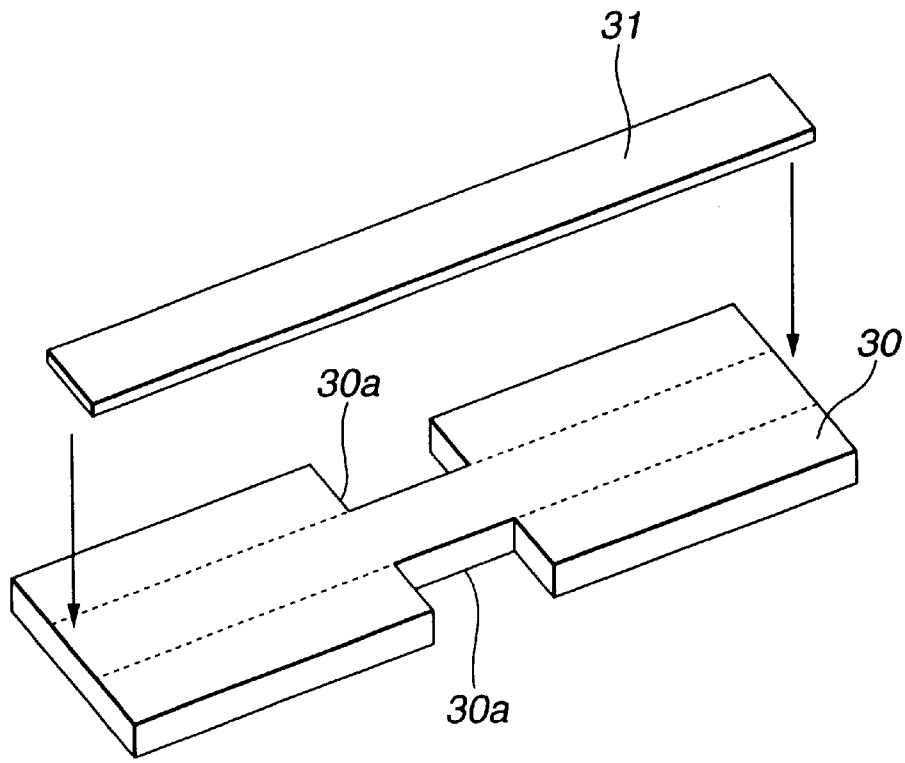
FIG. 8 is an exploded sectional view of a core unit provided in the sensor unit.

As shown in FIG. 8, the core unit 28 includes a core base 30 made of a nonmagnetic metal plate or the like and having cuts 30a formed nearly in the center thereof, and a core 31 made of a high permeability material such as Ni—Fe alloy. The core 31 is attached to the core base 30 to form the core unit 28. The sensor coil 29 is wound on the core base 30 and core 31 attached to the core base 30 and in the cuts 30a formed in the core base 30.

Figure 9:
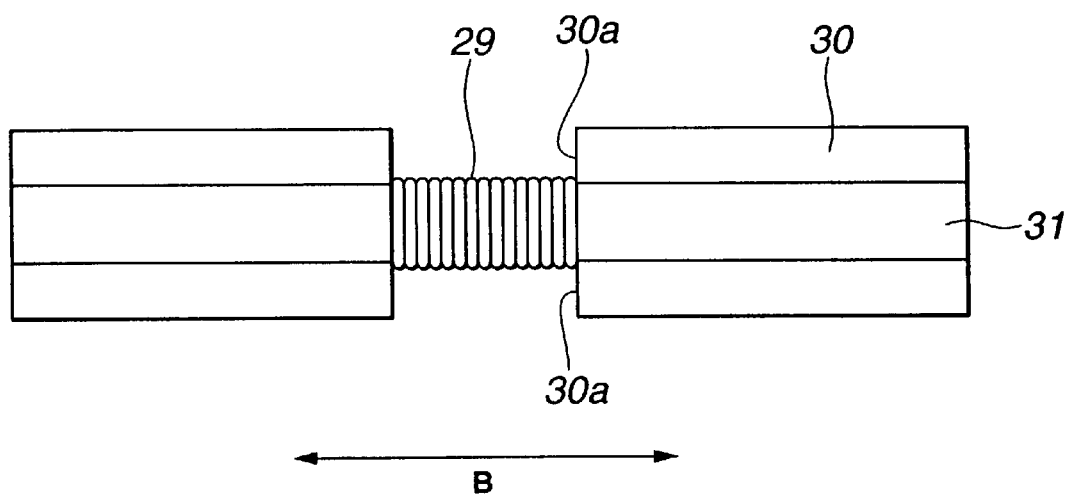
FIG. 9 is a plan view of the core unit on which a sensor coil is wound.

As shown in FIG. 9, the sensor coil 29 is formed from a Cu wire of about 30 $\mu$m in diameter for example wound to form a single layer on the core base 30 and core 31 and in the cuts 30a in the core base 30. More specifically, the sensor coil 29 is formed from 50 turns of the Cu wire coaxially with the bias coils 27 on the core base 30 and core 31 and in the cuts 30a. The length of the sensor coil 29 is about 1 mm.

The sensor coils 29 of the first sensor units 22 and 23 are connected in parallel to each other to form a bridge circuit and built in the drive/detection circuit which will further be described later. The sensor coils 29 of the first and second sensor units 22 and 23 are driven by the drive/detection circuit in phase with each other with a high frequency. Thereby, the first and second sensor units 22 and 23 will develop magnetic fields in the same directions as indicated with an arrow B in FIG. 9.

The magnetic field sensor 20 constructed as in the above can detect, with a high sensitivity, an external magnetic field incident upon the first and second sensor units 22 and 23 along the longitudinal direction of them, namely, an external magnetic field parallel to the direction of a magnetic field developed by the sensor coil 29. The magnetic field sensor 20 is disposed over the scale 10 movably in relation to the latter in such a manner that the direction in which it can detect the external magnetic field with the high sensitivity (magnetic detection direction) will coincide with the width direction of the scale 10, indicated with the arrow Y in FIG. 1, and the first and second sensor units 22 and 23 will take different positions in the Z-direction indicated with the arrow Z in FIG. 1, perpendicular to the X-direction being the longitudinal direction (relatively moving direction of the magnetic field sensor 20) of the scale 10 as well as to the Y-direction being the width direction of the scale 10.

In the above position transducer 1, as the moving part of the machine tool, industrial robot or the like moves linearly, the magnetic field sensor 20 will be moved linearly over the scale 10 along the center line A of the latter. With this linear movement of the magnetic field sensor 20 over the scale 10 along the center line A, the strength and direction of a magnetic field incident upon the magnetic field sensor 20 from the scale 10 will be changed linearly. Thus, the impedance of the sensor coil 29 driven with a high frequency by the drive/detection circuit will be changed linearly correspondingly to a moved position of the magnetic field sensor 20 relative to the scale 10. In the position transducer 1, the change of the impedance of the sensor coil 29, thus changed correspondingly to the moved position of the magnetic field sensor 20 relative to the scale 10, is converted to a voltage change and this voltage change is detected, to thereby detect an amount of travel of the magnetic field sensor 20 relative to the scale 10, that is, an amount of travel and moved position of the moving part of the machine tool, industrial robot or the like, to which the magnetic field sensor 20 or the scale 10 is fixed.

Also in the position transducer 1, since the sensor units 22 and 23 of the magnetic field sensor 20 are disposed in different positions in the Z-direction as shown in FIG. 1, there will take place a difference between the magnetic fields incident upon the first and second sensor units 22 and 23, respectively, from the scale 10. Especially in case the magnetic shielding plate 24 is disposed between the first and second sensor units 22 and 23, the magnetic field from the scale 10 will be blocked by the magnetic shielding plate 24, so that the magnetic field from the scale 10 will be incident only upon the first sensor unit 22 and it will little be incident upon the second sensor unit 23. That is, the difference between the incident magnetic fields incident upon the first and second sensor units 22 and 23, respectively, will be very large.

In the position transducer 1, since there occurs a difference between the incident magnetic fields upon the first and second sensor units 22 and 23 from the scale 10 as in the above, a difference in output between the first and second sensor units is determined to detect an amount of travel and moved position of the magnetic field sensor 20 relative to the scale 10, that is, an amount of travel and moved position of the moving part of the machine tool, industrial robot or the like. Thus, the position transducer 1 can detect, with a high accuracy, the amount of travel and moved position of the moving part while canceling an output change due to electric noises and temperature change affecting the magnetic field sensor 20.

Further in the position transducer 1, since the first and second sensor units 22 and 23 are driven in phase with each other, determination of the output difference permits to cancel an influence of an external magnetic field such as geomagnetism incident in phase and uniformly upon the first and second sensor units 22 and 23, which will make it possible to detect, with a higher accuracy, the amount of travel and moved position of the moving part.

The drive/detection circuit provided in the position transducer 1 will be described herebelow. The drive/detection circuit provided in the position transducer 1 is generally indicated with a reference 40 in FIG. 10. As shown, it includes an oscillation circuit 41, a switching circuit 42 which switches a driving current to the sensor coil 29 (will be referred to as "first sensor coil 29a" hereunder) of the first sensor unit 22 and sensor coil 29 (will be referred to as "second sensor coil 29b" hereunder) of the second sensor unit 23 on the basis of a pulse signal from the oscillation circuit 41, a first smoothing circuit 43 which detects and smoothes an output voltage of the first sensor coil 29a, a second smoothing circuit 44 which detects and smoothes an output voltage of the second sensor coil 29b, a differential amplification circuit 45 which detects a difference between output voltages from the first and second smoothing circuits 43 and 44 and provides a differential signal, and a bias circuit 46 which drives and controls the bias coil 27 (will be referred to as "first bias coil 27a" hereunder) of the first sensor unit 22 and bias coil 27 (will be referred to as "second bias coil 27b" hereunder) of the second sensor unit 23.

Figure 10:
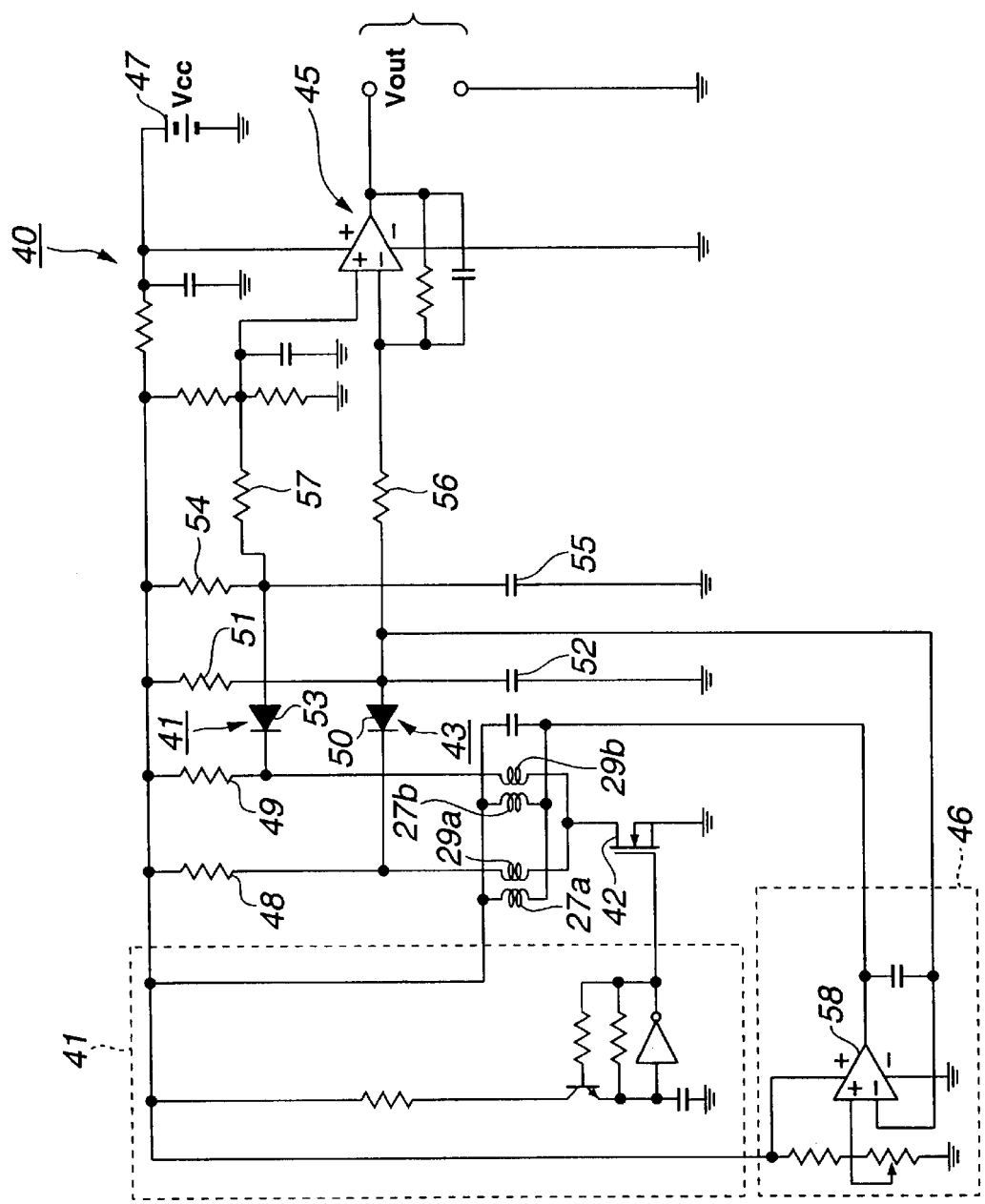
FIG. 10 is a circuit diagram of a drive/detection circuit provided in the position transducer according to the present invention.

The above oscillation circuit 41 generates a high frequency pulse signal whose frequency is 1 MHz and pulse width is 100 ns. Since the oscillation circuit 41 shown in FIG. 10 is of a multivibrator type, it includes a smaller number of parts and thus can be produced inexpensively. Also, the oscillation circuit 41 makes an RC oscillation, so it will not influence the characteristics of the sensor coils 29a and 29b. Note that the oscillation circuit 41 may be a one using a Colpitts oscillator or crystal oscillator.

The switching circuit 42 switches a driving current through the first and second sensor coils 29a and 29b correspondingly to the high frequency pulse signal from the oscillation circuit 41.

Note that the sensor coils 29a and 29b may be driven with a sinusoidal wave. However, the pulse signal is advantageous in that it contains a high frequency component and so can drive the sensor coils 29a and 29b efficiently, its duty ratio can be adjusted and so contribute to a reduced power consumption, and that it contains a DC component and so the point of impedance change with respect to an external magnetic field can freely be changed. Therefore, the sensor coils 29a and 29b should desirably be driven with a pulsed wave.

As aforementioned, the first and second sensor coils 29a and 29b are connected in parallel to each other to form a bridge circuit, and built in the drive/detection circuit 40. More specifically, the first sensor coil 29a is connected at one end thereof to a power source 47 via a bridge resistor 48 and at the other end to the switching circuit 42. The second sensor coil 29b is connected at one end thereof to the power source 47 via a bridge resistor 49 and at the other end to the switching circuit 42. The sensor coils 29a and 29b thus connected in parallel to each other and built in the drive/detection circuit 40 are switched by the switching circuit 42 and thus driven in phase with each other and excited in phase with each other with a high frequency.

The first smoothing circuit 43 includes a diode 50 having a cathode thereof connected to a junction of the first sensor coil 29a and bridge resistor 48, a resistor 51 connected at one end thereof to the power source 47 and at the other end to an anode of the diode 50, and a capacitor 52 connected at one end thereof to the ground potential and at the other hand to the anode of the diode 50. The first smoothing circuit 43 is provided to smooth a voltage produced at the first sensor coil 29a excited with a high frequency.

Similarly, the second smoothing circuit 44 includes a diode 53 having a cathode thereof connected to a junction of the second sensor coil 29b and bridge resistor 49, a resistor 54 connected at one end thereof to the power source 47 and at the other end to an anode of the diode 53, and a capacitor 55 connected at one end thereof to the ground potential and at the other hand to the anode of the diode 53. The first smoothing circuit 44 is provided to smooth a voltage produced at the second sensor coil 29b excited with a high frequency.

The above differential amplification circuit 45 is connected at a negative input terminal thereof to the anode of the diode 50 in the first smoothing circuit 43 via a resistor 56 and at a positive input terminal to the anode of the diode 53 in the second smoothing circuit 44 via a resistor 57. The differential amplification circuit 45 is provided to amplify a difference between a voltage produced by the first sensor coil 29a and smoothed by the first smoothing circuit 43 and a voltage produced by the second sensor coil 29b and smoothed by the second smoothing circuit 44.

The bias circuit 46 is provided to drive and control the first and second bias coils 27a and 27b to improve the impedance change of the first and second sensor coils 29a and 29b due to a magnetic field, and apply an appropriate bias magnetic field to the first and second sensor units 22 and 23.

The bias circuit 46 includes an operational amplifier 58 which is supplied at a negative input terminal thereof with a voltage produced by the second sensor coil 29b and smoothed by the second smoothing circuit 44, and at a positive input terminal with a desired voltage. The operational amplifier 58 has connected to the output terminal thereof the first and second bias coils 27a and 27b.

The bias circuit 46 thus constructed can drive and control the first and second bias coils 27a and 27b connected to the output terminal of the operational amplifier 58 according to a desired voltage supplied to the positive input terminal of the operational amplifier 58, and thus always equalize the voltage produced in the second sensor coil 29b and smoothed by the second smoothing circuit 44 to the desired voltage supplied to the positive input terminal of the operational amplifier 58. Thus, even when a change of the ambient temperature around the magnetic field sensor 20 has caused a change in impedance of the first and second sensor coils 29a and 29b, an optimum bias magnetic field can always be applied to the first and second sensor units 22 and 23, whereby the output linearity can be improved.

Since the first and second sensor coils 29a and 29b are driven with a high frequency pulse signal, a DC component is already applied to the sensor coils 29a and 29b. Therefore, the optimum amount of magnetic bias for a best change in impedance of the first and second sensor coils 29a and 29b due to an external magnetic field will be different from the application of a bias magnetic field in the same direction as the excited and driven direction of the sensor coils 29a and 29b to the application of a bias magnetic field in an opposite direction to the excited and driven direction of the sensor coils 29a and 29b. Thus, in case a bias magnetic field is applied in an opposite direction to the excited and driven direction of the sensor coils 29a and 29b, it has to be larger or stronger than a bias magnetic field applied in the same direction as the excited and driven direction of the sensor coils 29a and 29b.

In case a bias magnetic field is applied in an opposite direction to the excited and driven direction of the sensor coils 29a and 29b, a relatively strong magnetic field has to be applied as in the above. In this case, however, the sensitivity of the magnetic field sensor 20 to an external magnetic field may be relatively low with an impedance change being nearly the same as a one which would be when a bias magnetic field is applied in the same direction as the excited and driven direction of the sensor coils 29a and 29b. Therefore, in case the magnetic field sensor 20 is required to work stably with an external magnetic field, a bis magnetic field should desirably be applied in an opposite direction to the excited and driven direction of the sensor coils 29a and 29b. On the other hand, when the magnetic field sensor 20 is required to have an improved sensitivity rather that such a stable operation with an external magnetic field, a bias magnetic field should be applied in the same direction as the excited and driven direction of the sensor coil 29a and 29b.

In the drive/detection circuit 40 constructed as in the above, when the switching circuit 42 is switched with a high frequency pulse signal from the oscillation circuit 41, the first and second sensor coils 29a and 29b are driven in phase with each other and excited in phase with each other with a high frequency. At this time, the impedances of the first and second sensor coils 29a and 29b will be determined by the strength of an external magnetic field incident upon the sensor coils 29a and 29b in a direction parallel to the excited direction of the sensor coils 29a and 29b.

Since the first and second sensor units 22 and 23 are disposed in positions where they will detect a magnetic field from the scale 10 with different sensitivities, respectively, as in the above, there will take place a difference between the impedances of the sensor coils 29a and 29b. The difference in impedance between the sensor coils 29a and 29b will change correspondingly to a relative position of the magnetic field sensor 20 to the scale 10.

In the drive/detection circuit 40, a voltage corresponding to the impedance of the first sensor coil 29a is smoothed by the first smoothing circuit 43 and supplied to the differential amplification circuit 45, while a voltage corresponding to the impedance of the second sensor coil 29b of the second sensor unit 23 is smoothed by the second smoothing circuit 44 and supplied to the differential amplification circuit 45. The differential amplification circuit 45 will determine a difference between the output voltages (differential output) from the first and second sensor coils 29a and 29b to detect an amount of travel and moved position of the magnetic field sensor 20 relative to the scale 10.

It should be noted that the drive/detection circuit 40 provided in the position transducer 1 according to the present invention is not limited to the example shown in FIG. 10 but may be any one which is adapted to drive the first and second sensor coils 29a and 29b and detect as a differential output a voltage change corresponding to a change in impedance of the first and second sensor coils 29a and 29b, and drive and control the bias coils 27a and 27b appropriately to apply an optimum bias magnetic field to the first and second sensor units 22 and 23.

Figure 11:
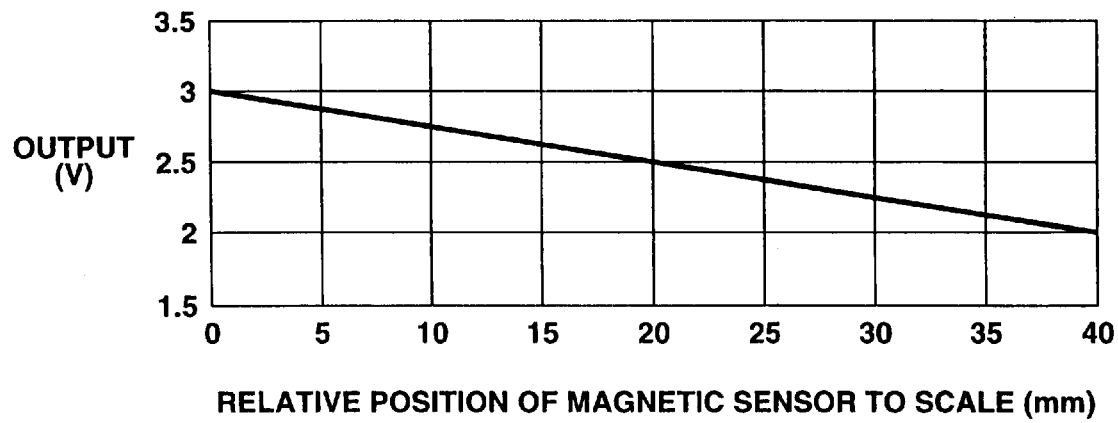
FIG. 11 shows the output characteristic of the position transducer according to the present invention.

FIG. 11 shows the output characteristic of the position transducer 1 constructed as in the above. As seen, in the position transducer 1, when the magnetic field sensor 20 moves relative to the scale 10 in a range of the effective length for detection of 40 mm, it provides an output which changes linearly in a range of 2 to 3 V. Therefore, by fixing one of the scale 10 and magnetic field sensor 20 of the position transducer 1 to a moving part of a machine tool, industrial robot or the like while the other to a stationary part of the machine tool etc. so that as the moving part moves, the magnetic field sensor 20 is moved relatively to the scale 10, it is possible to detect, with a high accuracy, an amount of travel and moved position of the moving part of the machine tool in a range of 40 mm.

Also in the position transducer 1, since changes in impedance of the sensor coils 29a and 29b due to the relative movement of the magnetic field sensor 20 to the scale 10 are converted to voltage changes and a difference between the output voltages is determined to detect a moved position of the magnetic field sensor 20 relative to the scale 10 as having been described in the foregoing, an amount of travel and moved position of the magnetic field sensor 20 relative to the scale 10, namely, an amount of travel and moved position of the moving part of the machine tool, fixed to the magnetic field sensor 20 or scale 10, can be detected with a very high accuracy while canceling the output characteristic change of the sensor coils 29a and 29b due to electric noises and change of the ambient temperature around the sensor coils 29a and 29b.

Also in the position transducer 1 according to the present invention, since a moved position of the magnetic field sensor 20 relative to the scale 10 is detected by determining a difference in output between the first and second sensor units 22 and 23 driven in phase with each other as having been described above, an amount of travel and moved position of the moving part of the machine tool can be detected with a high accuracy while canceling influence of a disturbing magnetic field such as geomagnetism incident in phase and uniformly upon the first and second sensor units 22 and 23.

Figure 12:
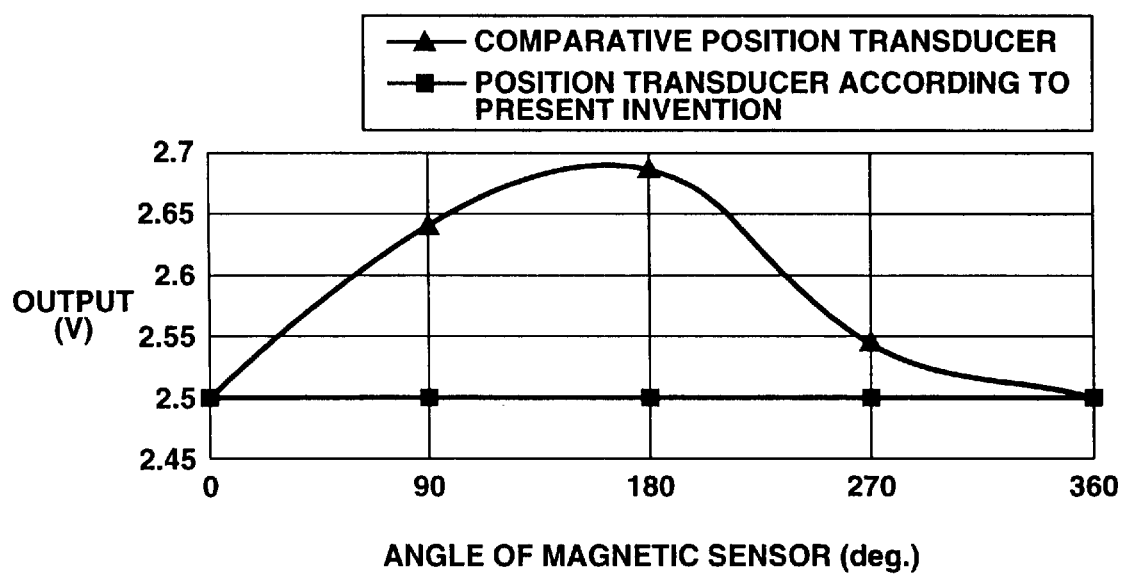
FIG. 12 shows relations between output of the position transducer according to the present invention and geomagnetism, and between output of a comparative position transducer and geomagnetism.

FIG. 12 shows a relation between output of the position transducer 1 according to the present invention and a disturbing magnetic field such as geomagnetism, and also a relation between output of a comparative position transducer in which a relative position of a magnetic sensor to a scale is detected by determining a different between outputs of two magnetic sensors driven in opposite phases, respectively, to each other and a disturbing magnetic field such as geomagnetism. The relations between the outputs of these position transducers and the disturbing magnetic field such as geomagnetism were determined by detecting an output of the position transducer turned about a Z-axis (direction indicated with arrow Z in FIG. 1) with the magnetic sensor taken as a center.

As seen from FIG. 12, the output changes when the comparative position transducer is turned about the X-axis with the magnetic sensor taken as a center. Since the relative position of the magnetic sensor to the scale is not changed when the position transducer is so turned, the output is changed due to a disturbing magnetic field such as geomagnetism. Thus, if the output is changed due to the disturbing magnetic field such as geomagnetism, an amount of travel and moved position of the magnetic sensor relative to the scale cannot be detected accurately.

On the other hand, in the position transducer 1 according to the present invention, even if it is turned about the Z-axis with the magnetic field sensor 20 taken as a center, no output change will take place for the following reason. That is to say, in the position transducer 1 according to the present invention, since a moved position of the magnetic field sensor 20 relative to the scale 10 is detected by determining a difference between outputs of the first and second sensor units 22 and 23, it is possible to cancel the influence of a disturbing magnetic field such as geomagnetism, incident in phase and uniformly upon the first and second senor units 22 and 23. Note that FIG. 12 shows the relation between output of the position transducer 1 and disturbing magnetic field when the position transducer 1 is turned about the Z-axis but it has been found that the output will little change even when the position transducer 1 is turned about the X-axis (direction indicated with arrow X in FIG. 1) and also about the Y-axis (direction indicated with arrow Y in FIG. 1).

Since with the position transducer 1 according to the present invention, it is possible to effectively cancel the influence of disturbing magnetic field such as geomagnetism, an amount of travel and moved position of the magnetic field sensor 20 relative to the scale 10, that is, an amount of travel and moved position of the moving part fixed to the magnetic field sensor 20 or scale 10 can be detected with an extremely high accuracy.

Also, in the position transducer 1 according to the present invention, the first sensor unit 22 with the first bias coil 27a and second sensor unit 23 with the second bias coil 27b are driven in phase with each other so as to be sensitive to an external magnetic field having the same direction as the first and second sensor units 22 and 23 and the bias coils 27a and 27b are driven by the bias circuit 46 so that the output of the second sensor unit 23, taken as a reference output, will be constant. So, even when the impedances of the first and second sensor coils 29a and 29b are changed due to a change of the ambient temperature around the magnetic field sensor 20, an optical bias magnetic field can always be applied to the first and second sensor units 22 and 23 to improve the output linearity, whereby an amount of travel and moved position of the magnetic field sensor 20 relative to the scale 10, namely, an amount of travel and moved position of the moving part fixed to the magnetic field sensor 20 or scale 10, can be detected with a higher accuracy.

Figure 13:
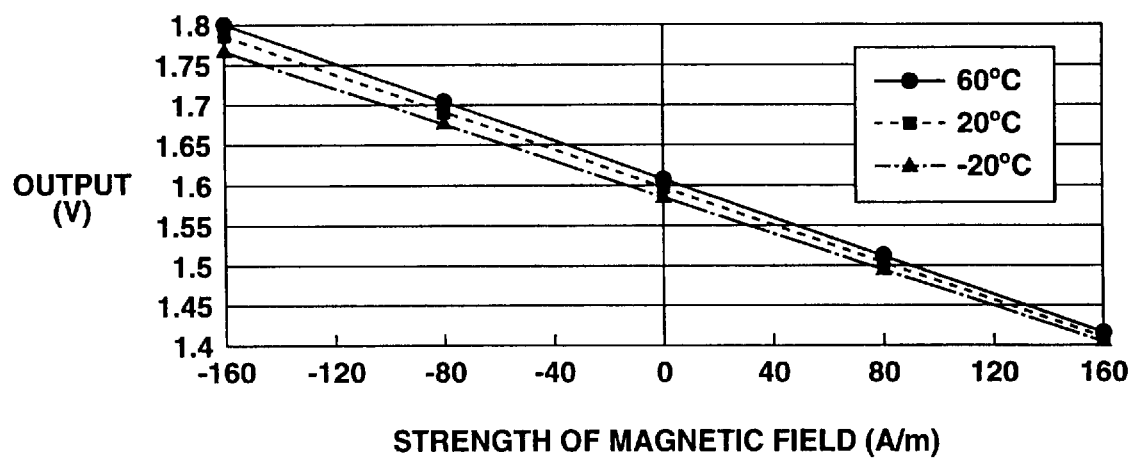
FIG. 13 shows changes in output of the position transducer according to the present invention when the ambient temperature around the magnetic sensor changes.
Figure 14:
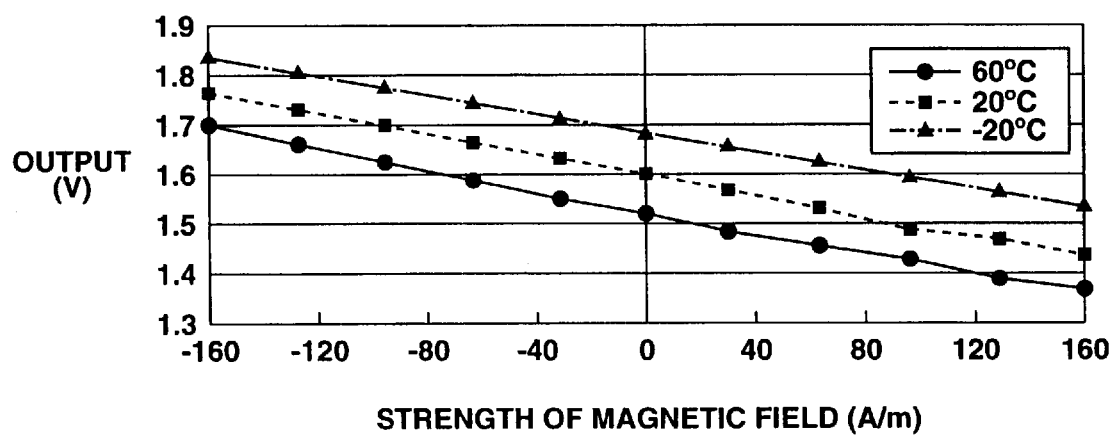
FIG. 14 shows changes in output of the comparative position transducer when the ambient temperature around the magnetic sensor changes.

FIG. 13 shows changes in output of the position transducer 1 constructed as in the above according to the present invention when the ambient temperature around the magnetic field sensor 20 changes, and FIG. 14 shows changes in output of the comparative position transducer, constructed such that first and second sensor units are always applied with a constant bias magnetic field, when the ambient temperature around the magnetic sensor changes.

As seen from FIG. 14, in the comparative position transducer, when the ambient temperature around the magnetic sensor changes, the output changes very much for the following reason. Namely, in the comparative position transducer, since a constant bias magnetic field is always applied to the first and second sensor units irrespectively of the ambient temperature around the magnetic sensor, no optimum bias magnetic field can be applied to the first and second sensor units if the impedances of the sensor coils are changed due to a change of the ambient temperature around the magnetic sensor and thus the optimum bias point is shifted. Thus, a change of the magnetic sensor output due to a change of the ambient temperature around the magnetic sensor will make it impossible to appropriately detect an amount of travel and moved position of the magnetic sensor relative to the scale.

On the other hand, with the position transducer 1 according to the present invention, it is possible to considerably suppress the variation of the magnetic sensor output even when the ambient temperature around the magnetic field sensor 20 changes, as shown in FIG. 13. This is because in the position transducer 1 according to the present invention, the output of one of the first and second sensor units 22 and 23 driven in phase with each other, that is, the output of the second sensor unit 23 in this case, is taken as a reference output and the bias coils 27a and 27b are driven and controlled by the bias circuit 46 for the reference output to be a constant voltage, and thus an optimum bias magnetic field can always be applied to the first and second sensor units 22 and 23 even when the impedances of the first and second sensor coils 29a and 29b are changed due to a change of the ambient temperature around the magnetic field sensor 20.

As having been described in the foregoing, in the position transducer 1 according to the present invention, since the output change due to a change of the ambient temperature around the magnetic field sensor 20 can be suppressed considerably, it is possible to detect, with a higher accuracy, an amount of travel and moved position of the magnetic field sensor 20 relative to the scale 10, namely, an amount of travel and moved position of the moving part of the machine tool or the like, fixed to the magnetic field sensor 20 or scale 10.

Note that the aforementioned position transducer 1 has been described as an example intended to illustrate and describe the construction of the position transducer according to the present invention and may be subjected to various modifications without departing from the scope and spirit of the present invention.

Figure 15:
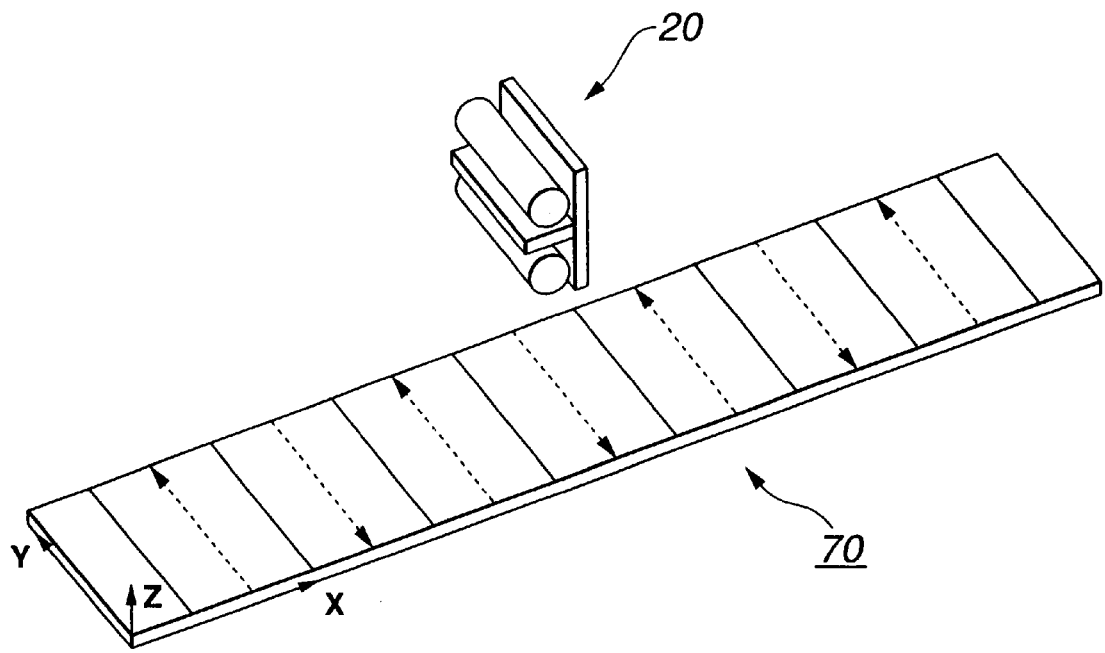
FIG. 15 is a perspective view of another embodiment of the position transducer according to the present invention.

In the aforementioned position transducer 1, the magnetic field developing means for developing a magnetic field whose strength and direction are variable correspondingly to a position of the magnetic field developing means is the scale 10 being a combination of the first to fourth magnetic field developing members 11, 12, 13 and 14 polarized in a direction perpendicular to the main sides of the scale thereof. According to another aspect of the present invention, however, the scale 10 may be replaced with a scale 70, as a magnetic field developing means, which is polarized in a Y-direction perpendicular to the relatively moving direction of the magnetic field sensor 20 (X-direction) and parallel to the main sides thereof and develops magnetic fields opposite in direction to each other at regular directions along the X-direction, as shown in FIG. 15 for example.

In the aforementioned position transducer 1, to detect a magnetic field from the scale 10, there is used the magnetic field sensor 20 constructed as an MI effect type sensor using the so-called MI (magnetic impedance) effect. The magnetic field sensor 20 may be any one which applies a bias magnetic field, such as a flux gate type magnetic field sensor, an MR sensor using the MR (magnetic resistance) effect or the like.

Figure 16:
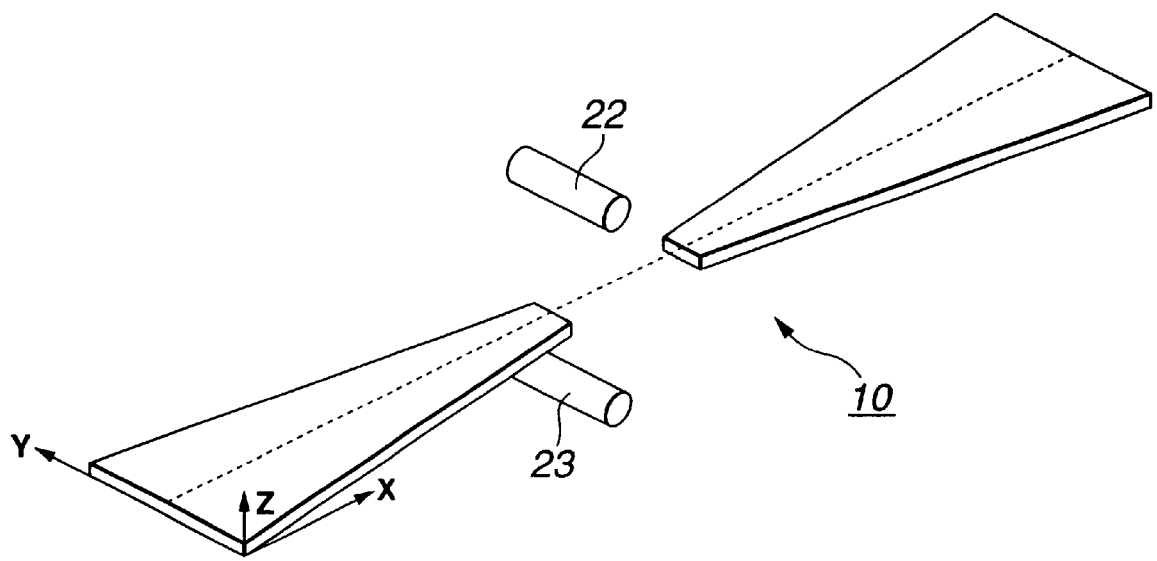
FIG. 16 is a perspective view of a still another embodiment of the position transducer according to the present invention.

Also in the aforementioned position transducer 1, the first and second sensor units 22 and 23 of the magnetic field sensor 20 are disposed on one of the main sides of the scale 10. The first sensor unit 22 is disposed near the scale 10 while the second sensor unit 23 is disposed at a position separate from the scale 10, so that there will take place a difference between a magnetic field incident upon the first sensor unit 22 from the scale 10 and a one incident upon the second sensor unit 23 from the scale 10. According to a yet another aspect of the present invention, however, the first sensor unit 22 may be disposed on one of the main sides of the scale 10 while the second sensor unit 23 is disposed on the other main side, as shown in FIG. 16, so that there will take place a difference between a magnetic field incident upon the first sensor unit 22 from the scale 10 and a one incident upon the second sensor unit 23 from the scale 10.

In this case, the direction of the magnetic field incident upon the first sensor unit 22 from the scale 10 is opposite to that of the magnetic field incident upon the second sensor unit 23 from the scale 10. So, by determining a difference between outputs of the first and second sensor units 22 and 23, it is possible to provide a larger output than in the aforementioned two other embodiments while canceling the influence of a disturbing magnetic field such as geomagnetism incident in phase and uniformly upon the first and second sensor units 22 and 23.

What is claimed is:

1. A magnetic sensor comprising:
   a plurality of sensor units each including a magnetic detector and a bias magnetic field developing means for applying a bias magnetic field to the magnetic detector; and
   means for driving and controlling the bias magnetic field developing means in the plurality of sensor units; wherein
   the means for driving and controlling monitors an output from one magnetic detector in one of the plurality of sensor units, and drives and controls the bias magnetic field developing means in the plurality of sensor units so that the monitored one magnetic detector provides a constant output.

2. The magnetic sensor as set forth in claim 1, wherein the bias magnetic field developing means includes a bias coil wound on the one magnetic detector; and wherein
   the means for driving and controlling drives and controls the bias magnetic field developing means by adjusting a current supplied to the bias coil.

3. The magnetic sensor as set forth in claim 1, wherein the one magnetic detector includes a core unit made of a high permeability material, and a sensor coil wound on the core unit is driven with high frequency pulses to detect an external magnetic field based on a change of sensor coil impedance due to the external magnetic field.

4. A position transducer including:

magnetic field developing means for developing a magnetic field whose strength and direction are changed corresponding to a position of the magnetic field developing means;

a plurality of sensor units, each including a magnetic detector and a bias magnetic field developing means for applying a bias magnetic field to each of the magnetic detectors and moveable relative to the magnetic field developing means;

means for driving and controlling the bias magnetic field developing means in each of the sensor units; and means for detecting a moved position of each of the plurality of sensor units relative to the magnetic field developing means based on an output from the magnetic detector in each of the plurality of sensor units; wherein the means for driving and controlling monitors the output from one magnetic detector in one of the plurality of sensor units, and drives and controls the bias magnetic field developing means in each of the plurality of sensor units so that the one monitored magnetic detector provides a constant output.

* * * * *